Figure 1:
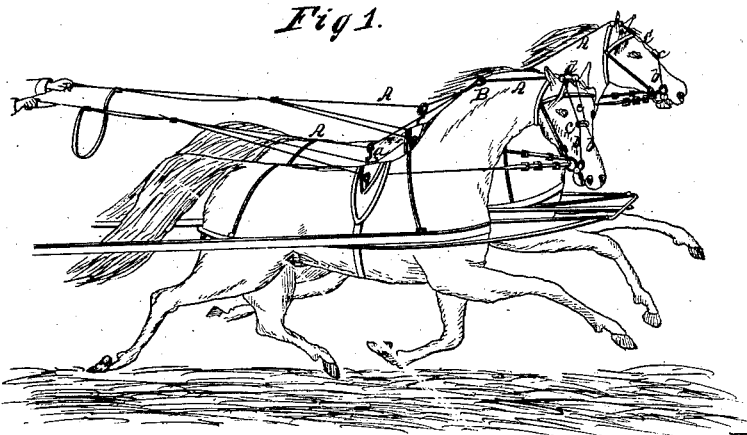
Figure 2:
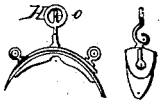
Figure 4:
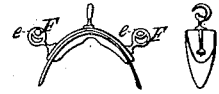
Figure 3:
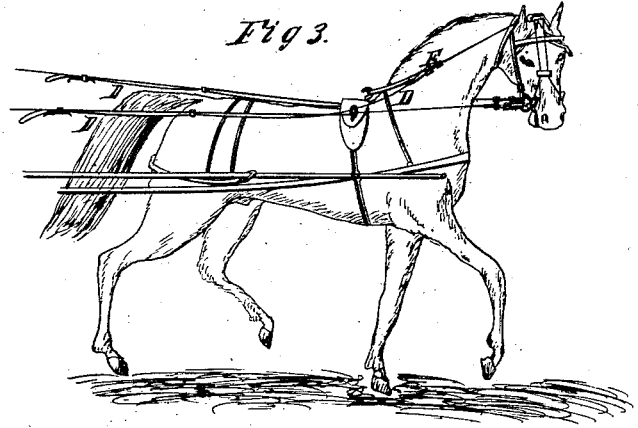

I. Stanbery,
Safety Rein.

Nº 69,269. Patented Sep. 24, 1867.

Witnesses.
C. H. Wilson
Chas. A. Pooler

Inventor
Ira Stanbery
by his Attorney
Henry C. Dane
Washington

United States Patent Office.

IRA STANBERY, OF ST. LOUIS, MISSOURI.

Letters Patent No. 69,269, dated September 24, 1867.

---

IMPROVED SAFETY-REIN.

---

*The Schedule referred to in these Letters Patent and making part of the same.*

---

TO ALL WHOM IT MAY CONCERN:

Be it known that I, IRA STANBERY, of the city of St. Louis, county of St. Louis, State of Missouri, have invented certain new and useful improvements in "Safety-Reins" for double and single harness; and I hereby declare that the following is a full and exact description thereof, reference being had to the accompanying drawings, and to letters of reference marked thereon.

The nature of my invention consists in having small, strong reins, made of leather or any other material, which are attached to the full Kimball-Jackson over-head check-rein, half Kimball-Jackson, or to any other check-rein, between the water-hook and horse's head, so that the check, as a check, is not disturbed in the least when the safety-rein is not in use; then passing back through an elevated dee, placed on top of the water-hook on double harness, and through subdivisions in the "terrets" or dees on the single harness, then with the driving-reins to the driver's hand, so that I use the "line within a line." The elevated dee on the water-hooks is especially for double harness, and subdivisions in ordinary dees for single harness. The attachment of my rein to check-rein is about half-way from water-hook to top of horse's head, by means of buckles.

To enable others skilled in the art to make and use my invention, I will proceed to describe its construction and operation, referring to drawings.

Figure I is my "safety-reins," as applied to double harness, with my improved "water-hook" especially for safety-reins.

Figure II represents rear and side view of double-harness saddle-tree, showing improved water-hook for same.

Figure III represents my "safety-reins," as applied to and used on single harness, with the improved subdivided dees especially for safety-reins.

Figure IV represents rear and side view of saddle-tree for single harness, with the improved subdivided "dees" or terrets for safety-reins.

I will first describe the manner in which my safety-reins are made and used on the double harness, as it is on the double harness I claim the greatest advantage. The harness is an ordinary one, with my reins and improved water-hooks for my reins, and a full or half "Kimball-Jackson check," to which my reins are attached, but they may be used in connection with any other check.

A A are my safety-lines, passing from the driver's hands, through the driving-reins, to and through my improved water-hook $a$ to the check, and attached thereto at B. Each safety-rein is independent, and controls one horse only, so that checking one does not interfere with the other, thus giving the driver great advantage over all other safety-reins. C is the "full Kimball-Jackson over-head check," consisting of an extra bit held in the mouth by the lines $b$ $b$ passing through loop $c$, over the head, through loops on top of bridle at $d$, and uniting with my safety-lines at B.

My improvement in water-hook consists of a small "dee" above the hook proper, through which my safety-rein passes, which keeps it in place, and prevents entanglement with the "driving-reins." It may be made with or without the division-post, as represented by $o$. By attaching my safety-reins at B, and carrying them back through my elevated "dee" for that purpose, and using the "Kimball-Jackson check," either full or half, as on single or double harness, I am able to get sufficient purchase to stop any horse with a slight pull on my safety-rein, and, being independent, I check one horse without annoying the other. And my "combination" leaves my reins free and convenient when not in use, as my improved water-hook and "dees" keep them separate.

In Fig. III I represent my safety-reins as used on single harness. D D are the safety-reins, passing from driver's hands, through the driving-reins, to and through "subdivided" terrets or dees, to the full or half "Kimball-Jackson check," as represented, and attaching at E, thus leaving the check in full operation, as a check, when my safety-reins are not in use. F is the terret, with subdivision $e$ for my rein or any "safety-rein." My rein may be attached to any "check" with the same advantage, in proportion, as to the "Kimball-Jackson checks." By attaching my reins at B and E, and passing them back, as represented, I have a direct action upon the horse's mouth, and with the "Kimball-Jackson check" I am able to lift the horse's head, by direct action upon the upper part of the mouth, and prevent kicking or running, as the horse cannot control the bit when acted upon by my reins.

What I claim as my invention, and desire to secure by Letters Patent, is—

1. The attaching of my "safety-rein" to the "Kimball-Jackson over-head check," or any other check, back of the top of the horse's head and forward of the water-hook, as represented, for the use and purpose as herein specified and set forth.

2. The passing of the lines or safety-reins, as attached, through my elevated "terret" or dee on my double harness, and through the subdivisions of the "terrets" or "dees" on my single harness, for the use and purpose as specified and herein set forth.

3. The small "terret" or "dee" elevated above the water-hook, with or without division-post $o$ and the subdivisions $e\ e$ in the dees F F, for lines on single harness, all for my safety-reins or any other safety-reins, for the use and purpose as specified and herein set forth.

4. The combination of my attachment of my safety-reins to the checks at B and E, passing them through elevated terret H or subdivided terrets F F to the driver's hands, by enclosing them within the driving-reins, thus using the "line within a line" for the use and purpose as specified and herein set forth.

<div style="text-align: right;">IRA STANBERY.</div>

Witnesses:
    F. D. STANBERY,
    IRA STANBERY, Jr.